United States Patent [19]

Jon et al.

[11] 4,419,562

[45] Dec. 6, 1983

[54] NONDESTRUCTIVE REAL-TIME METHOD FOR MONITORING THE QUALITY OF A WELD

[75] Inventors: Min-Chung Jon, East Windsor Township, Mercer County; Vito Palazzo, Hamilton Township, Mercer County, both of N.J.

[73] Assignee: Western Electric Co., Inc., New York, N.Y.

[21] Appl. No.: 340,607

[22] Filed: Jan. 19, 1982

[51] Int. Cl.³ ............................................. B23K 9/10
[52] U.S. Cl. ........................ 219/130.01; 219/121 LB; 228/104
[58] Field of Search ....................... 219/130.01, 130.21, 219/121 LB; 228/104

[56] References Cited

U.S. PATENT DOCUMENTS

| | | |
|---|---|---|
| 3,648,009 | 3/1972 | Steigerwald . |
| 3,679,865 | 7/1972 | Jenitzer et al. ................. 219/130.01 |
| 3,824,377 | 7/1974 | Notvest . |
| 3,986,391 | 10/1976 | Vahaviolos ................... 219/121 LB |
| 4,007,631 | 2/1977 | Saifi et al. . |
| 4,144,766 | 3/1979 | Wehrmeister . |

FOREIGN PATENT DOCUMENTS 1430824  4/1976  United Kingdom ........... 219/130.01

OTHER PUBLICATIONS

R. E. Herzog, "Forecasting Failures with Acoustic Emission", *Machine Design*, vol. 45, 6/14/73, pp. 132–137.

G. T. Mallick, Jr., "Acoustic Die Monitoring", S.M.E. Technical Paper TE77-502, 1977, pp. 1–15.

*Primary Examiner*—C. C. Shaw
*Attorney, Agent, or Firm*—M. M. de Picciotto

[57] ABSTRACT

Herein disclosed is a noncontact, nondestructive method for monitoring the quality of a high energy weld, e.g., laser beam weld. In accordance with the proposed method, an acoustic sensor (32) is positioned at a distance from the welding zone (34) and picks up airborne acoustic emission signals (33) associated with the laser welding process. These acoustic signals, propagating through the air space between the welding zone (34) and the sensor (32), are detected and analyzed (36,37) to determine the quality of the weld (FIG. 3).

4 Claims, 3 Drawing Figures

NONDESTRUCTIVE REAL-TIME METHOD FOR MONITORING THE QUALITY OF A WELD

TECHNICAL FIELD

The present invention relates to a method for monitoring the quality of a weld and more particularly to a noncontact nondestructive method for the real-time monitoring of laser welds using acoustic emission techniques.

BACKGROUND OF THE INVENTION

In the production of electrical and electronic components in which materials are joined, it is imperative to achieve a good quality joint in order to increase the reliability of such components. High energy welding techniques, such as laser or electron beam welding, are capable of generating extremely localized high energy beams resulting in unique advantages when welding small workpieces or components. The integrity of such welding techniques is determined by analyzing the resulting welds. Such analysis may vary from a mere visual inspection of the welded joint on the workpiece to a detailed post-welding X-ray, ultrasonic, or infrared examination of the welded workpiece or component. Often, destructive methods are used to evaluate the joining technique by testing samples, rather than all, of the components produced.

In order to achieve a more reliable evaluation technique, several known nondestructive testing methods were developed to analyze the integrity of high energy welding techniques. One of such known methods described in U.S. Pat. No. 4,007,631 uses Stress Wave Emission (SWE) techniques also referred to as Acoustic Emission (AE) techniques, to monitor the quality of a laser weld. In accordance with this known method, which has proven to be effective and accurate, a piezoelectric transducer is attached to one of the parts to be welded or is mounted on a fixture which is in contact with at least one of the parts. The transducer converts the acoustic emission (AE) signals generated within the parts being welded during the welding operation into an electrical signal for further processing. When welds are to be made on a large number of parts located on a single fixture, multiple transducers are required since reflections and attenuations of the AE signals prevent the use of a single transducer. Furthermore, if the high energy welding technique is performed on relatively small pieceparts or components, it becomes difficult to physically attach the transducer to such a small part for AE signal detection.

Therefore, there exists a need for a noncontact, nondestructive method for monitoring the quality of welds during the welding process.

SUMMARY OF THE INVENTION

The present invention solves the foregoing problems with a method for monitoring the quality of a weld on a workpiece comprising the steps of positioning a high frequency acoustic sensor in noncontact spaced relation with the workpiece and in noncontact spaced relation with the weld site on the workpiece; detecting at the acoustic sensor airborne acoustic signals generated at the weld site; and analyzing the detected airborne acoustic signals thereby determining the quality of the weld.

One advantage of the present invention is the elimination of any direct mounting of the acoustic sensor on the workpiece or component being welded.

Another advantage of the present invention is the ability to monitor the quality of a weld without requiring the mounting of the acoustic sensor on the workpiece holder.

A further advantage of the present invention is the ability to achieve a reliable evaluation of the quality of a weld on the workpiece regardless of the complexity or topography of the workpiece holder.

A still further advantage of the present invention is the ability to maintain the acoustic sensor at a predetermined distance from the weld site thereby enabling an accurate monitoring of the quality of a laser weld.

These and other advantages of this invention will appear more fully upon consideration of the various illustrative embodiments now to be described in detail in connection with the accompanying drawings.

DETAILED DESCRIPTION

Figure 1:
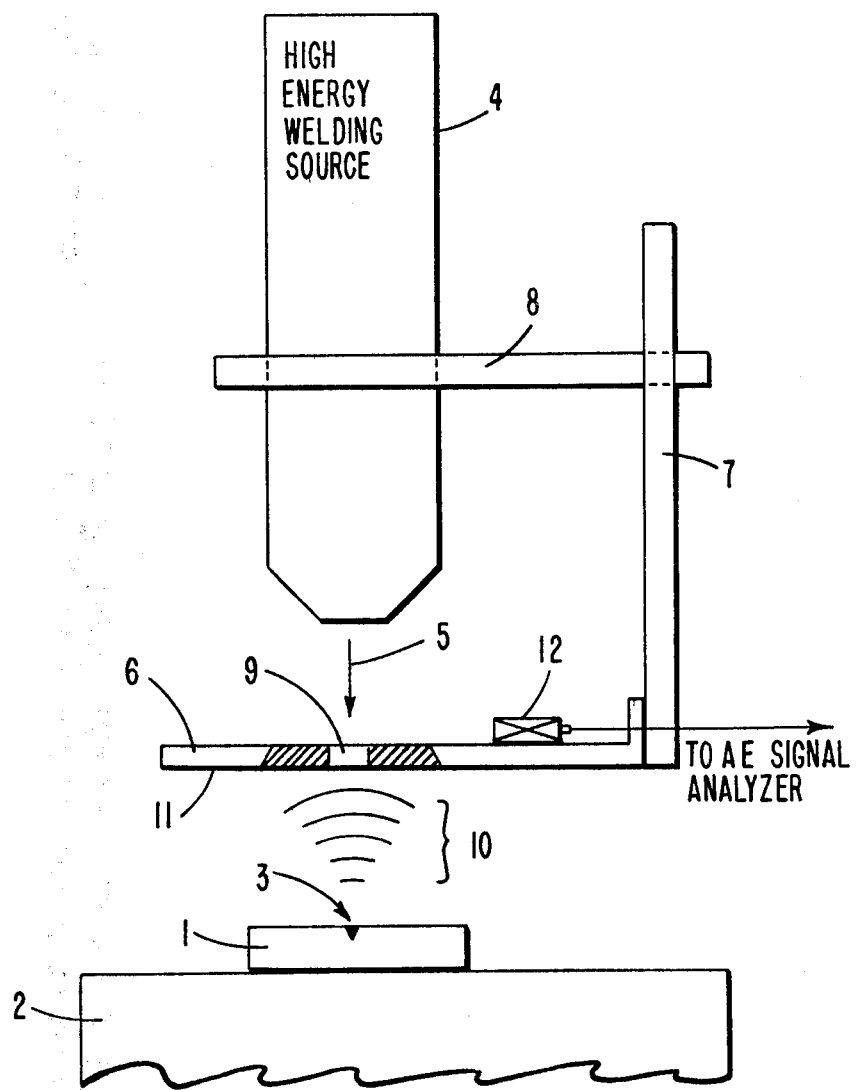
FIG. 1 is a schematic representation of an airborne acoustic emission detection system in accordance with the present invention.

Schematically shown in FIG. 1 is an arrangement for implementing the weld monitoring method in accordance with an illustrative embodiment of the present invention. Workpiece 1 to be welded is placed on a receiving base 2 such that the intended weld site 3 on the workpiece 1 is exposed to a high energy welding source 4. The latter may be for example a laser beam source or any other high energy source suitable for welding operations. For purpose of illustration only, the following description refers to a laser beam welding technique. However, without departing from the spirit and scope of the present invention, the present inventive concepts are readily applicable to other types of welding techniques. Thus, welding source 4 generates a high energy laser beam 5 directed toward the weld site 3 of workpiece 1. Positioned between the welding source 4 and the workpiece 1 is a metal plate 6 attached to a mounting arm 7 which in turn is slidably coupled to a mounting bracket 8 fixed to welding source 4. The coupling between plate 6, arm 7 and bracket 8 is such that the distance between plate 6 and workpiece 1 can be selectively varied by moving the arm 7 with respect to the bracket 8.

As shown in FIG. 1, plate 6 has an aperture 9 for enabling the passage of laser beam 5 towards the weld site 3 of the workpiece. The impact of the laser beam 5 on the workpiece 1 results in the generation of airborne acoustic emission signals illustratively shown by reference numeral 10. Such airborne signals propagate away from the workpiece 1 through the air space between the workpiece and the metal plate 6. The airborne AE signals 10 impact the latter on its back surface 11 and cause the generation of signals within the plate. These generated signals are detected by means of a high frequency acoustic sensor 12 attached to the plate 6. Although sensor 12 is shown attached to the upper surface of plate 6, the present arrangement will also operate with sensor 12 attached to the back surface 11 of plate 6. The analysis by an AE signal analyzer (not shown) of the detected signals enables a determination of the quality of the weld being performed at weld site 3.

A possible explanation for the generation of the airborne AE signals may be summarized as follows: as the result of the impact between incoming laser beam 5 and the surface of the solid metallic workpiece 1, a metallic liquid formation takes place at the weld site 3. Due to the high temperature of the liquid formation, vaporization and plume formation follow. The interaction between the incoming laser beam 5 and the plume generates an air shock wave which propagates away from the weld site 3 towards the back surface 11 of the plate 6. Such an airborne wave impacts the plate 6 causing acoustic emission signals being generated therein. Therefore, there exists a correlation between the quality of the weld at the weld site 3 and the airborne AE signals 10 detected by the high frequency acoustic sensor 12.

Figure 2:
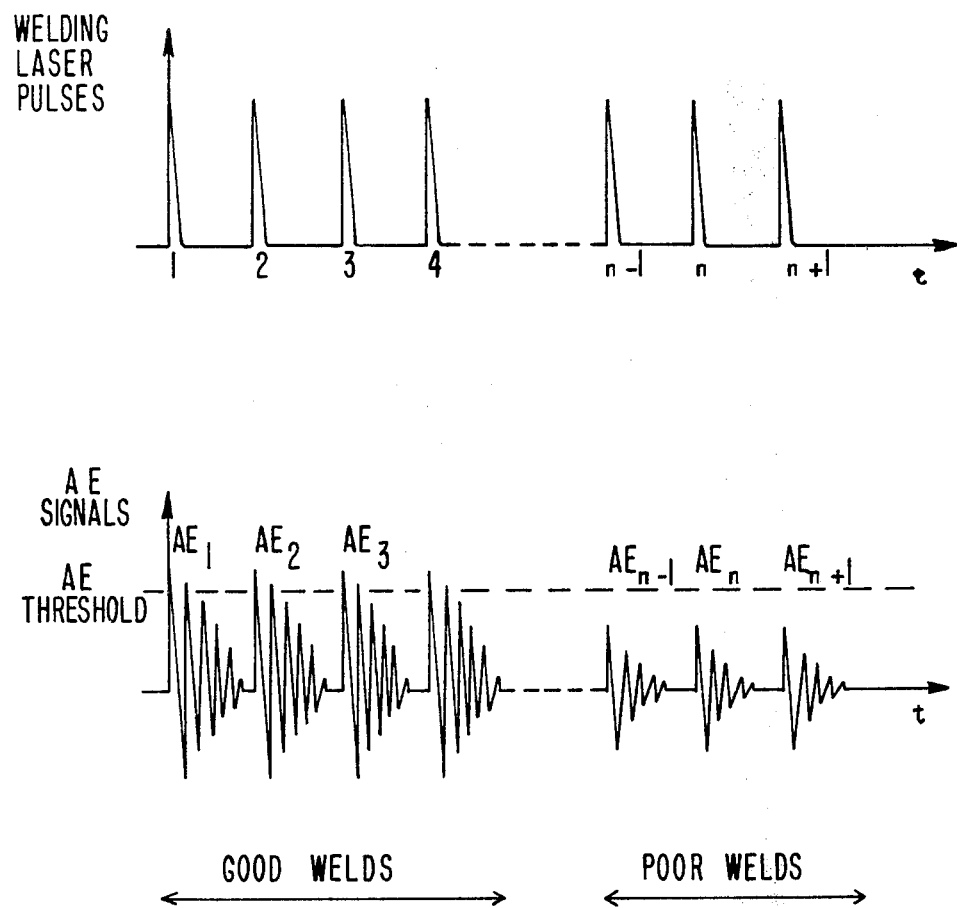
FIG. 2 is a wave diagram relating to the embodiment shown in FIG. 1.

Shown in FIG. 2 is a series of n+1 welding laser pulses, wherein each one of the laser pulses impinges upon the workpiece to be welded. Also shown is an equal number of acoustic emission signals $AE_1$ to $AE_{n+1}$ generated in response to the incoming laser pulses. As long as a good laser coupling exists between the welding beam and the welded material, the acoustic emission signals have an amplitude above a predetermined threshold level, $AE_{threshold}$. However, as illustratively shown in connection with laser pulses $n-1$, n and $n+1$, the corresponding acoustic emission signals $AE_{n-1}$, $AE_n$ and $AE_{n+1}$ exhibit an amplitude lower than that of the threshold level when a poor laser coupling exists between the welding beam and the welded material resulting in bad welds. The acoustic emission threshold level is set at a value above the noise level of the electronic circuitry used in the AE signal analyzer. Such AE threshold level will typically be of the order of 500 mV.

Figure 3:
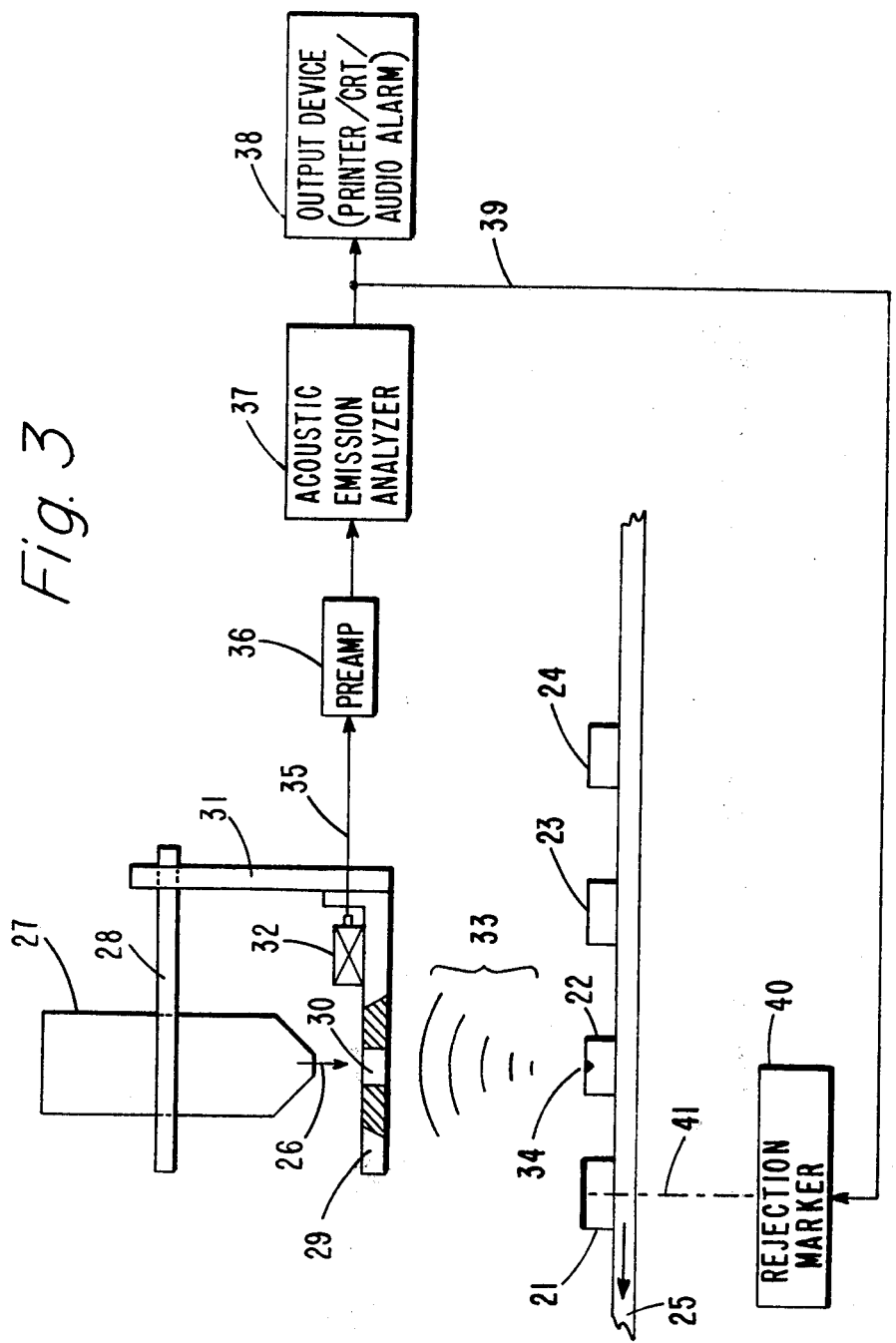
FIG. 3 is a partial block diagram of an on-line acoustic emission laser weld monitoring system incorporating the present inventive concepts.

Shown in FIG. 3 is an acoustic emission laser weld monitoring system implementing an on-line real-time analysis of laser welds. A plurality of pieceparts to be welded 21, 22, 23, 24 are fed on a conveying arrangement 25 such that each piecepart is sequentially exposed to a laser welding beam 26 generated by a laser source 27. As described above in connection with the embodiment shown in FIG. 1, a mounting bracket 28 is attached to laser source 27. A metal plate 29, having an aperture 30 to enable the passage of laser beam 26 therethrough, is slidably coupled to the bracket 28 by means of coupling arm 31. A high frequency acoustic sensor 32 is attached to metal plate 29 for detecting the airborne acoustic signals 33 generated at the respective weld sites, e.g., 34 on piecepart 22. An mentioned in connection with acoustic sensor 12 of FIG. 1, sensor 32 may be attached to either surface of metal plate 29 without departing from the spirit and scope of the present invention.

The high frequency acoustic sensor 32 generates low level signals on its output lead 35 in response to the airborne acoustic signals 33. The low level signals on lead 35 are amplified by a low noise preamplifier 36, the output of which is coupled to an acoustic emission signal analyzer 37 of a generally known type. AE analyzer 37 includes, for example, a threshold detector circuit for discriminating between high and low amplitude AE signals respectively corresponding to a good quality laser weld and a poor quality laser weld. The output terminal of AE analyzer 37 is coupled to an output monitoring device 38. Such output device may be a printer, a CRT display device, an audio alarm system, or any other well known interface information system capable of controlling the welding operations performed on the various pieceparts 21 to 24. The output of AE analyzer 37 is also coupled via lead 39 to a rejection marking arrangement 40 capable of marking, after the welding operation, any one of the welded pieceparts comprising a bad or defective weld. Such marking operation is schematically illustrated by mechanical linkage 41 which may include a stamping, labelling or other identification technique, for marking a defective welded piecepart.

In the illustrative embodiments of FIGS. 1 and 3, the high energy welding source 4 and 27 may be a commercially available $CO_2$ laser capable of being repetitively fired thereby generating successive laser beams resulting in contiguous melting zones on the piecepart being welded. Preferably, metal plates 6 in FIG. 1 and 29 in FIG. 3 are steel plates of about 3 inches by 3 inches with a thickness of about 0.1 inch respectively having apertures 9 and 30 of about 0.5 inch in diameter. Acoustic sensors 12 and 32 are preferably wideband piezoelectric transducers of commercially available type, and have a frequency response above 100 kltz. Moreover, in order to improve the sensitivity and reliability of the present technique, steel plates 6 and 29 have a well finished back surface (i.e., the surface facing the workpiece being welded) to achieve a good coupling between the airborne acoustic signals 10 and 33 and the respective acoustic sensors 12 and 32.

The foregoing illustrative embodiments have been presented merely to illustrate the pertinent inventive concepts. Numerous modifications can be made by those skilled in the art without departing from the spirit and scope of the invention.

What is claimed is:

1. Method for monitoring the quality of a weld on a workpiece comprising the steps of:
positioning a high frequency wideband acoustic emission sensor in noncontact spaced relation with the workpiece and in noncontact spaced relation with the weld site on said workpiece;
detecting at said acoustic emission sensor airborne shock wave signals propagating away from the weld site and having a frequency above 100 KHz; and
analyzing the detected high frequency acoustic emission signals thereby determining the quality of the weld.

2. Method for monitoring the quality of a weld on a workpiece comprising the steps of:
directing a high energy welding beam toward a weld site on the workpiece thereby forming a plume at said weld site;
positioning a high frequency wideband acoustic emission sensor in noncontact spaced relation with the workpiece and in noncontact spaced relation with the weld site;
detecting at said acoustic emission sensor airborne shock wave signals propagating away from the plume and having a frequency above 100 KHz; and
analyzing the detected high frequency acoustic emission signals thereby determining the quality of the weld.

3. Method for monitoring the quality of a weld according to claims 1 or 2, wherein the positioning step comprises the step of:

attaching said high frequency acoustic emission sensor to the surface of a metal plate; and positioning said metal plate at a predetermined distance from said workpiece.

4. Method for monitoring the quality of a weld according to claim 3, wherein said metal plate is positioned between said workpiece and a welding source.

* * * * *